United States Patent [19]

Stevens

[11] 4,160,523
[45] Jul. 10, 1979

[54] AIR STRUCTURE

[76] Inventor: Graham A. Stevens, 55 Colebrooke Row, London N.1., England

[21] Appl. No.: 786,441

[22] Filed: Apr. 8, 1977

[30] Foreign Application Priority Data

Apr. 9, 1976 [GB] United Kingdom ............... 14500/76

[51] Int. Cl.$^2$ .............................................. F24J 3/02
[52] U.S. Cl. .................................. 237/1 A; 126/271; 126/400; 52/2
[58] Field of Search ............... 237/1 A; 126/270, 271, 126/400; 47/17; 98/31; 165/166; 52/2, 616, 618

[56] References Cited

U.S. PATENT DOCUMENTS

| 2,889,763 | 6/1959 | Pine | 98/31 |
|---|---|---|---|
| 3,223,018 | 12/1965 | Tucker, Sr. | 98/31 |
| 3,387,412 | 6/1968 | Kwake | 52/2 |
| 3,498,368 | 3/1970 | Conangle | 47/17 |
| 3,863,621 | 2/1975 | Schoenfelder | 126/270 |
| 3,902,474 | 9/1975 | Pyle | 237/1 A |
| 3,908,631 | 9/1975 | Rom | 52/2 |
| 3,918,430 | 11/1975 | Stout et al. | 165/170 |
| 3,955,555 | 5/1976 | Bostrom | 126/270 |
| 3,981,445 | 9/1976 | Custer | 237/1 A |
| 4,003,365 | 1/1977 | Wiegand et al. | 237/1 A |
| 4,004,380 | 1/1977 | Kwake | 52/2 |
| 4,006,856 | 2/1977 | Nilsson | 237/1 A |
| 4,016,702 | 4/1977 | Nakada et al. | 52/2 |
| 4,020,989 | 5/1977 | Kantz | 237/1 A |
| 4,054,246 | 10/1977 | Johnson | 126/400 |

Primary Examiner—Henry C. Yuen
Attorney, Agent, or Firm—Kurt Kelman

[57] ABSTRACT

An air structure comprises a double-skin wall construction having an outer skin that is substantially transparent to short wave solar radiation but relatively opaque to long wave heat radiation and an inner skin. Radiation converter elements, preferably in the form of black plastic diaphragms linking the inner and outer skins and effective to absorb solar radiation and to convert the same to heat energy are disposed in the inter-skin space. The structure is self-erecting on exposure to solar radiation, and may advantageously be combined with a heat store that emits heat and maintains the structure erected under conditions of reduced solar radiation availability. The structure may be free floating or may be anchored to the ground to form, for instance, a greenhouse or other enclosure.

17 Claims, 4 Drawing Figures

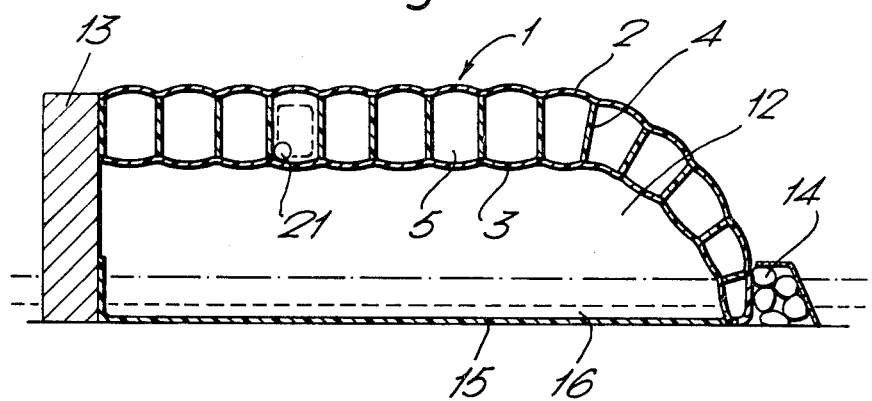
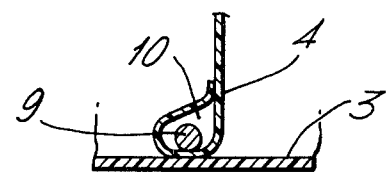

AIR STRUCTURE

BACKGROUND OF THE INVENTION

This invention concerns air structures - that is to say structures the major boundary walls of which are defined by flexible material that is at least substantially impermeable to air and intended to be supported and/or stiffened into a desired configuration by the application of a pressure differential to the respective surfaces thereof. A hot-air balloon is an example of such a structure but the principles involved have been applied or proposed for application to a wide variety of constructs, such as stadia and like arenas, temporary buildings and enclosures for, e.g., exhibition purposes, greenhouses and so on.

With certain exceptions, most air structures hitherto constructed or proposed have relied upon inflation of their contained volume or of some part thereof to establish the required pressure differential to support and/or stiffen the flexible walls into the desired configuration. This inflation has in general been accomplished by the use of mechanical devices such as fans and blowers driven by energy-consuming motors so that although the structure may have a low energy content in the materials of its construction, as well as the advantages of light weight and ease of construction and erection, its continued existence in an erected condition involves the continuing expenditure of energy.

An object of the present invention is therefore to provide an air structure the erection and maintenance of which is at least partly accomplished by the utilisation of energy derived from its surroundings, for instance solar radiation energy.

The use of solar radiation energy for inflation of an air structure has been proposed hitherto but such proposals as have been tested have exhibited unsatisfactory characteristics, mainly as a result of their being based upon constructional principals applicable to structures intended to be inflated and maintained by the continuous application of internal positive pressure by mechanical devices. For the efficient utilisation of solar radiation, the direct conversion of such radiation to longer-wave energy must take place within the confines of the structure and accomplish direct heating of the air therewith in order to achieve the required pressure differential for satisfactory inflation of the structure. Such design principles therefore imply the utilisation of wall-forming components that are suitably transparent to the solar radiation.

In general it has not been found possible, hitherto, to obtain an adequate pressure differential across the walls of such a structure, inflated by the use of solar radiation energy, to make the structure sufficiently rigid to resist deformation under wind loads. Moreover, in common with mechanically-inflated structures, the existence of a positive pressure within the structure tends to supplement the aerodynamic lift forces that are applied to the structure by winds blowing thereover. Accordingly, structures such as hitherto proposed to be maintained by utilisation of solar energy would in general be viable only in relatively still air conditions.

SUMMARY OF THE INVENTION

An air structure in accordance with the present invention in accordingly characterised by having a double-skin wall construction of which at least the outer skin is at least substantially transparent to shortwave solar radiation but relatively opaque to long wave heat radiation, the inter-skin space including at least one radiation converter element effective to absorb solar radiation and to convert the same to heat energy.

An air structure in accordance with the invention is self-erecting when exposed to solar radiation. Such radiation is able to enter the inter-skin space via the outer skin that is at least substantially transparent to such radiation and within the inter-skin space becomes converted into heat energy that is released into the air contained within the inter-skin space. As a result of heating, such contained air expands and becomes less dense than the ambient atmosphere so that the structure becomes buoyant. Because the outer skin at least is opaque to long wave heat radiation, the heat energy derived from the solar radiation is unable to escape from the structure — otherwise than into the space enclosed by the structure — and the structure can accordingly self-erect and maintain itself in conditions of relatively low solar energy availability.

The structure of the invention may be adapted for use as an unanchored flying structure for use, for instance, as a flying ship, as a floating "cloud" for transporting water, or for meteorological or telecommunications purposes. Alternatively, the structure may be anchored, and thus a further feature of the invention may comprise means for anchoring the perimeter of said double-skin construction so that the latter may adopt an arched configuration when inflated.

Preferably the periphery of the double-skin wall construction is adapted to be sealed to the ground so that either the enclosed space may be pressurised to increase the rigidity of the structure for certain applications or so that any tendency of the double-skin wall construction to extend owing to wind lift, and thereby increase the contained volume of the enclosure defined by the structure, will result in a lowering of the pressure within the enclosed space and thereby partial compensation for the aerodynamic lift forces.

The structure of the invention may have a wide range of configurations and dimensions, ranging from a single arch with a span of a few meters to a macro structure having a plurality of connected arches and of sufficient size to cover, for example, a city or a forest, and the structure may thus be used for a variety of different purposes. For instance, the structure may be floated on water to provide a cover for fish farming operations. Alternatively, the structure may be used as a swimming pool cover and may be adapted to perform the additional function of heating water for the pool by utilizing solar energy. In addition, the structure of the invention is ideally suited to the construction of greenhouses because by appropriate selection of the materials for the skins of the wall construction the latter may be arranged to transmit to the enclosure defined by the structure that portion (wavelengths in the range 400–700nm) of the solar radiation spectrum that is especially conducive to photosynthesis. Because the air within the enclosure need not participate in the function of erecting and maintaining the structure in an erect condition, the atmospheric conditions within the enclosure may be controlled and adjusted independently of the conditions within the inter-skin space of the wall construction.

Desirably the double-skin wall construction comprises inner and outer skin linked together at intervals by diaphragms that constitute the said energy converters, these diaphragms thus performing a plurality of functions: controlling the separation of the inner and outer skins; dividing the inter-skin space into tunnel like spaces within which the contained air is in relatively close proximity to and may maintain vigorous circulation in contact with the diaphragms to collect heat energy therefrom; and the function of absorbing solar radiation and converting this to heat energy.

In preferred embodiments of the invention the structure has the configuration of an extended large-span arch terminated by part-spherical ends, the diaphragms forming the said energy converters extending in parallel planes at right angles to the axis of curvature of the arch, and similarly in the part-spherical ends, so that the tunnel-like spaces between the diaphragms extend upwardly from the perimeter of the structure to its highest level. This arrangement is favoured for various reasons amongst which may be cited the convenience of integrating the diaphragm/skin junctions with attachments or housings for receiving anchoring cables or like flexible but strong-in-tension elements serving both to reinforce the skins and to provide for the convenient diffusion of anchoring loads into the skin. The anchoring cables preferably have elastic properties, thus allowing the wall construction to extend and so reduce the pressure within the space enclosed by the structure thereby compensating for aerodynamic lift forces. Another advantage of this configuration is that it allows for provision of convective or forced air flow through the tunnel-like spaces for control of the buoyancy of the structure and for such other purposes as extracting moisture from the ambient atmosphere, as will be explained.

Advantageously the double-skin wall construction has provision for controlled venting thereof for pressure regulation and other purposes. Thus it should be understood that in conditions of high solar energy availability, air contained within the inter-skin space may expand to the extent that it must be allowed to vent to relieve excess pressure. Desirably vents are provided near the periphery of the wall and the inter-skin space is arranged to communicate with a thermal store, such as a concrete member or a pile of soil, sand rocks or the like, through which escaping air may pass to give up heat to the store and from which re-entering air may gain heat for reinflation of the inter-skin space, e.g. under subsequent conditions of reduced solar radiation availability and decrease in contained air temperature. In a convenient arrangement, the thermal store may consist of a rock pile serving the dual purpose of functioning as a thermal store and of anchoring the perimeter of the double-skin wall construction to the ground.

The venting arrangements for the inter-skin space of the wall construction may provide for the forcing of air flow through the inter-skin space by the use of fans or other mechanical devices or, preferably, by the effects of pressure differences between the sides of the structure and due, for instance, to the wind or to the effects of shadow on one side.

Thus at the perimeter of the wall there may be provided valves such as simple flap valves to control the ingress and egress of air to the inter-skin space and where appropriate such valves may communicate with external shrouds or conduits for the purpose of enhancing or directing the flow of air into and out of the inter-skin space.

The double-skin wall construction may be formed of a variety of materials but flexible plastics materials such as for instance film or sheet polyester, PVC, polyethylene and like materials are preferred because these may be obtained in forms having the desired combination of physical and mechanical properties.

Thus in preferred embodiments of the invention the outer skin at least of the wall is formed of a plastic film material that is transparent to short wave solar radiation while being relatively opaque to long wave heat radiation whereas the inner skin may either be formed of similar material having comparable physical properties or it may be formed of a material that is at least partly reflective to solar radiation to limit the passage of solar radiation beyond the inter-skin space and into the enclosure defined by the structure. Such reflectivity can conveniently be accomplished by "silvering" the base material of the skin as by metal deposition thereon or by the incorporation of a suitable metallic layer in a laminated skin construction.

In preferred embodiments in which the energy converters are constituted by diaphragms linking the inner and outer skins of the wall, such diaphragms may again be formed of a plastics sheet material but of a suitably absorbtive character as regards solar radiation: for instance such diaphragms may be formed of a black or blackened plastics sheet material.

The structure of the invention may be equipped to perform a variety of ancillary functions appropriate to the intended utilisation of the structure. For instance if the characteristics of the inner skin are such that it mainly reflects solar energy it may take up a temperature below the dew-point of the ambient atmosphere and so be available for use as a condensing surface. By the provision of suitable arrangements for conducting the ambient atmosphere over the inner skin, such as appropriately located adjustable inlet and outlet valves, condensation will occur on the inner skin and condensate may be collected. Alternatively at least a portion of the inner skin may be made partly absorbent in respect of solar radiation so as to adopt a relatively high temperature and therefore be available as a heating surface for the evaporation of, e.g., brackish or salt water caused to flow over that surface by suitable pumping means. Water vapour so produced may then be conducted, for example by air flow controlled by appropriately located inlet and outlet valves, to suitable condensing surfaces, for instance other parts of the inner skin that are at a lower temperature by reason of being shaded or by reason of having suitably chosen physical properties for the purpose. Thus the structure may be caused to function as a solar still.

The structure may be equipped with means for modifying the properties of the wall with respect to transmission and reflection of radiation. For instance the inter-skin space may house inflatable reflective elements adapted, when inflated, to overlie the internal surface of the outer skin and thus give this reflective properties to minimise the ingress of solar radiation into the inter-skin space.

The said means for anchoring the structure conveniently comprise cables or like tension elements connected to and radiating from the perimeter of the double-skin wall construction and desirably, as has been mentioned, the anchoring loads are diffused into the wall construction by means of cables housed in the junctions between the wall skins and diaphragms linking the latter. In a preferred arrangement, the anchoring means comprise cables that extend from anchorage points on opposite sides of the structure through tunnel-like housings formed at the junction between the inner skin and each of the said diaphragms so that the inner skin is controlled in shape by the anchoring loads. However, for particularly large structures additional cables may extend in similar housings at the junctions between the diaphragms and the outer-skin.

In order to achieve an efficient seal between the wall construction and the ground, when such sealing is desired, the inner skin is preferably of larger extent than the outer skin so that its peripheral portion may be held in contact with the ground as by loading with suitable massive objects such as rocks, bricks, water tanks and so on, without interferring with the free movement of the periphery of the outer skin relatively to the inner skin during self-erection of the structure and changes in the wall configuration due to changing ambient and wind conditions.

When the structure of the invention is to be used as a greenhouse, the inner skin of the double-skin wall construction is preferably extended across the base of the structure to form a continuous under skin that prevents water loss in a downwards direction from the enclosure defined by the structure. For use, the under skin is covered with soil or other growing medium.

BRIEF DESCRIPTION OF THE DRAWINGS

A typical embodiment of the invention is illustrated diagrammatically and by way of example in the accompanying drawings in which:

FIG. 3 is a section on line 3—3 of FIG. 1; and

FIG. 4 is a detailed view of part of FIG. 3 on an enlarged scale.

DESCRIPTION OF THE PREFERRED EMBODIMENT

Figure 1:
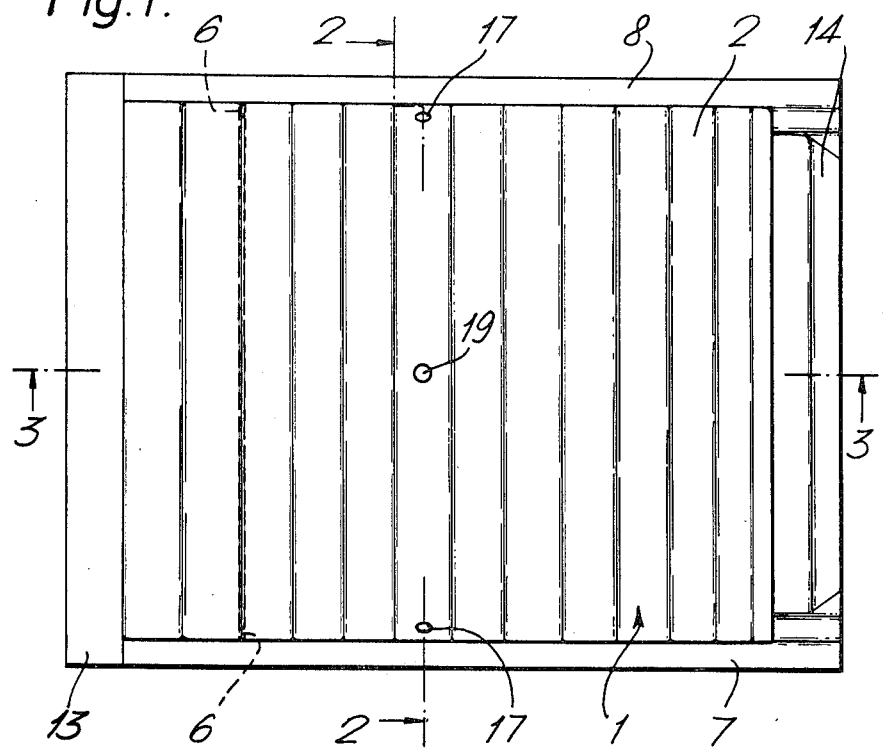
FIG. 1 is a diagrammatic plan view of an air structure embodying the invention.

The illustrated air structure comprises a greenhouse having the configuration of an extended large-span low or shallow arch with a lateral span of about 100m. The structure is constructed from a double-skin wall construction generally designated 1. having an outer skin 2 of a plastics film material that is transparent to short wave solar radiation while being relatively opaque to long wave heat radiation and an inner skin 3 also of a plastics film material that is "silvered", e.g. by metal deposition on the film or by the incorporation of a suitable metallic layer in a laminated skin construction, so that the inner skin 3 is at least partly reflective to solar radiation. The outer and inner skins are spaced about 3m apart and are linked together at intervals by a series of elongate planar diaphragms 4 that extend in a series of planes at right angles to the axis of curvature of the arch of the air structure, and thus divide the inter-skin space into a series of tunnel-like spaces 5, a small gap 6 being left at each end of each diaphragm 4 to allow communication between adjacent spaces 5. The diaphragms 4 are formed of plastics sheet material and are secured at their tops and bottoms to the adjacent skin, e.g. by stitching or welding. The surfaces of the diaphragms are provided with a black absorbtive coating, that absorbs solar radiation and converts the same to heat energy, a narrow uncoated strip being left adjacent the top and bottom of each diaphragm to avoid overheating, the diaphragms thus acting as radiation converter elements.

A thermal store 7, 8, in the form of an elongate substantially triangular section rock pile wall, extends along the opposed lateral sides of the perimeter of the wall construction 1 such that the air contained in the inter-skin tunnel like spaces 5 is in communication therewith. The structure is anchored to the thermal stores 7 and 8 and thus to the ground by a series of elastic cables 9 that extend between the thermal stores on the opposed sides of the structure via a series of tunnel like housings 10 (see FIG. 4) formed by folding the bottom edge of each diaphragm 4 to form a closed loop at each junction with the inner skin 3. The ends of each cable 9 are passed through the adjacent heat store 7, 8 and secured to an anchorage plate 11 disposed beneath the relevant heat store.

The ends of the wall construction 1 of the arched configuration are also secured to the ground so that a completely enclosed environment is formed within the enclosure 12 defined by the structure. Two possible methods of attachment of the ends are illustrated in FIG. 3. As shown on the left side of that Figure, the wall construction 1 may be secured to a vertical, suitably braced, support wall 13 by attaching the end diaphragm of the wall 1 to the wall 13 by, e.g., battening. Alternatively, and as shown on the right side of that Figure, the arched configuration of the structure may be curved downwardly to form a part spherical end portion of the structure, the end diaphragm of the wall 1 again being attached to the ground, e.g. by battening. A further thermal store 14 is advantageously provided at the perimeter of such an end portion of the structure.

Figure 2:
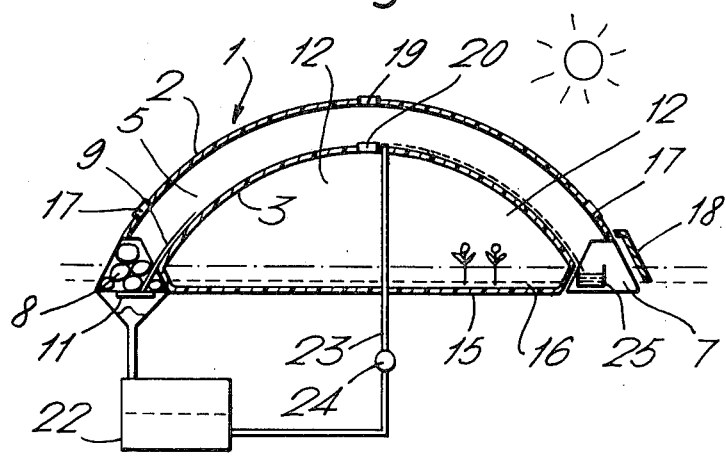
FIG. 2 is a section on line 2—2 of FIG. 1.

As can be seen in FIGS. 2 and 3, the inner skin 3 of the wall 1 is extended across the base of the structure to form a continuous under skin 15 and is extended to a suitable height up the support wall 13. The enclosure 12 is thus a completely sealed environment, and the continuous under skin prevents any moisture within the enclosure from escaping through the ground in a downwards direction. When the structure is ready for use as a greenhouse, soil or other growing medium 16 is disposed on the under skin to the level shown in dashed lines.

Access to the enclosure 12 is provided by, for example, a conventional airlock door (not shown) such as is commonly used with conventional airhouses.

As explained before, the double-skin wall construction of the structure enables the structure to self-erect on exposure to solar radiation, air contained within the inter-skin space being heated and thus expanding and providing buoyancy for the structure. A closable, two-way valve 17, such as a veined grill, is provided in the outer skin 2 at each end of each tunnel-like space 5 near the periphery of the wall 1, and may thus be adjusted to allow additional air to be drawn into the spaces 5 for inflation and erection of the structure. Alternatively, the structure may be ram inflated by passing air, e.g. from fans or blowers or due to natural wind forces, into the inter-skin space via a one way pressure-operated valve, such as a flap valve.

Once inflated and erected, heated air circulates within the tunnel-like spaces 5 of the structure and gives up a portion of its heat to the thermal stores 7 and 8, a heat shield 18 being provided if necessary. The heat thus stored in the thermal stores may be given up to the inter-skin air to maintain the structure in its erected condition under subsequent conditions of reduced solar radiation availability, e.g. at night. If necessary, additional means, such as fans or blowers, may be provided for maintaining the structure erect in such conditions. Alternatively, the structure may be maintained erect by pressurising the enclosure 12 in the manner of a conventional air house.

The elastic properties of the cables 9 and of the fabric from which the double-skin wall 1 is preferably constructed enable the wall construction to extend and so reduce the pressure within the enclosure 12 thereby compensating for aerodynamic lift forces. These properties also allow the structure to compensate for external loading forces, e.g. caused by precipitation collecting on the upper surface thereof, the decrease in volume of the enclosure 12 caused by such loading being accompanied by corresponding increase in pressure.

The functioning of the structure may be regulated in various ways, depending on the surrounding conditions and the properties required of the structure. For instance, the flow and volume of air within each space 5 may be regulated by adjusting the valves 17 and an additional one way outlet valve 19 disposed at the uppermost point of the upper skin 2. By suitable adjustment of the valves, air may be released from the spaces 5 to relieve excess pressure. A further series of one way valves 20 is also provided to allow for venting of air within the enclosure 12 into the inter-skin space.

In additon, inflatable reflective elements 21 are disposed within the spaces 5, the elements 21 being adapted, when inflated, to contact the internal surface of the outer skin 2 and thus give this reflective properties to minimise the ingress of solar radiation into the inter-skin space.

Further control may be provided by selective orientation of the diaphragms 4, effected by displacing the outer skin 2 with respect to the inner skin 3, thus regulating the ingress of solar radiation to the inter-skin space. In the extreme case, the outer skin 2 may be so displaced that the inner skin 3, diaphragms 4 and outer skin 2 contact and overlie each other forming a three layered surface, having adjacent reflective, black and transparent surfaces, that allows heat to escape from within the enclosure 12 and allows cooling thereof.

The air structure may be adapted to perform additional functions, and the illustrated arrangement is equipped and adapted to collect and effect circulation of water within the structure. Water is collected and stored in an underground storage tank 22, collection being effected, for example, by water vapour present in ambient air being condensed on the inner skin 3 on the cool, shaded side of the structure and allowed to run down the inner skin, through the rock pile thermal store 8 to the tank 22. The water may then be pumped in line 23 by means of a pump 24 powered by, for example, electricity derived from solar energy or wind forces, to the highest point of the arch and allowed to flow over the inner skin 3 on the hot, sunny side of the structure. The flowing water provides shade for crops etc. growing within the greenhouse, and may advantageously be coloured with a liquid known by the trade name SOL-VAP GREEN that allows selective transmission of wavelengths that are especially conducive to radiation. In addition, the water may become heated as it flows over the hot, sunny side of the greenhouse and treated water may be collected in a suitably located tank 25 and used either as a thermal store or as a source of hot water for other purposes, e.g. washing and cleaning.

The structure may be adapted according to the prevailing climatic conditions of its location. For instance, in cold climates the ground level inside and outside the structure may be higher, for example as shown in dot dash lines in FIGS. 2 and 3. The thermal stores 7, 8 are thus disposed partly below the ground and heat loss therefrom is reduced.

The structure of the invention thus utilises energy derived from its surroundings, for instance solar radiation energy and/or wind energy, to accomplish at least in part the erection and maintenance. In addition, the structure may be used to produce energy, for example in the form of heat stored in thermal stores, or in the form of electricity derived from solar cells located on the upper surface of the structure.

What I claim is:

1. An air-supported structure comprising a double-skin wall construction having an inner skin and an outer skin, the wall construction having the configuration of a large-span arch rising from a perimeter of the construction, the inner and outer skins being of flexible material at least substantially impermeable to air and defining therebetween an inter-skin space, the outer skin being at least substantially transparent to short wave solar radiation but relatively opaque to long wave heat radiation, air filling the inter-skin space for supporting the double-skin wall construction, and a plurality of radiation converter elements disposed in the inter-skin space, the converter elements being diaphragms spaced at intervals between the inner and outer skins, the diaphragms linking the skins, dividing the inter-skin space into tunnel-like spaces, and extending in parallel planes at right angles to the axis of curvature of the arch whereby the tunnel-like spaces extend upwardly from the perimeter to the apex of the arch, effective to absorb solar radiation and to convert the solar radiation to heat energy whereby the air filling the inter-skin space is heated.

2. The air-supported structure of claim 1, further comprising means for anchoring the perimeter of the double-skin wall construction to a base.

3. The air-supported structure of claim 2, wherein the anchoring means comprises means for sealing the perimeter to the base.

4. The air-supported structure of claim 1, wherein the double-wall skin wall construction defines an enclosure, the skins of the wall construction being of a material transmitting radiation of wavelengths in the range of 400 to 700 nm to the enclosure.

5. The air-supported structure of claim 1, further comprising controlled venting means for venting the air in the inter-skin space.

6. The air-supported structure of claim 5, wherein the venting means are arranged near the periphery of the wall construction, and further comprising a thermal store in communication with the inter-skin space.

7. The air-supported structure of claim 1, wherein the flexible material is a plastics film.

8. The air-supported structure of claim 7, wherein the inner plastics film skin is at least partly reflective to solar radiation.

9. The air-supported structure of claim 1, wherein the diaphragms are of black or blackened flexible plastics sheet material.

10. The air-supported structure of claim 1, wherein the inner skin is reflective to solar radiation and provides a condensing surface, and further comprising means for conducting the ambient atmosphere over the inner skin.

11. The air-supported structure of claim 1, wherein at least a portion of the inner skin facing the outer skin is partly absorbent of solar radiation and provides a heating surface, and further comprising pumping means for delivering a salt solution to the heating surface for flow thereover at least a portion of the inner skin facing away from the outer skin provides a condensing surface, means for delivering water vapor evaporated from the heating surface to the condensing surface, and collector means for collecting vapor condensation formed on the condensing surface.

12. The air-supported structure of claim 1, further comprising at least one inflatable reflective element housed in the inter-skin space, the reflective element being arranged to contact the outer skin upon inflation.

13. The air-supported structure of claim 1, wherein wall construction has a base and the inner skin has a portion extending across the base of the wall construction to form a continuous underskin.

14. An air-supported structure comprising a double-skinned wall construction having an inner skin and an outer skin, the inner and outer skins being of flexible material at least substantially impermeable to air and defining therebetween an inter-skin space, the outer skin being at least substantially transparent to short wave solar radiation but relatively opaque to long wave heat radiation, air filling the inter-skin space for supporting the double-skinned wall construction, a plurality of radiation converter elements disposed in the inter-skin space, the converter elements being diaphragms spaced at intervals between the inner and outer skins, the diaphragms linking the skins and dividing the inter-skin space into tunnel-like spaces, the converter elements being effective to absorb solar radiation and to convert the solar radiation to heat energy whereby the air filling the inter-skin space is heated, tunnel-like housings at the junctions linking the inner skin to the diaphragms, and anchoring cables extending through the tunnel-like housings to anchorage points at opposite sides of the double-skin wall construction.

15. The air-supported structure of claim 14, wherein the anchoring cables are of elastic material.

16. An air-supported structure comprising a double-skin wall construction having an inner skin and an outer skin, the inner and outer skins being of flexible material at least substantially impermeable to air and defining therebetween an inter-skin space, the outer skin being at least substantially transparent to short wave solar radiation but relatively opaque to long wave heat radiation, air filling the inter-skin space for supporting the double-skin wall construction, at least one radiation converter element disposed in the inter-skin space, the converter element being effective to absorb solar radiation and to convert the solar radiation to heat energy whereby the air filling the inter-skin space is heated, controlled venting means arranged near the periphery of the wall construction for venting the air in the inter-skin space, and a thermal store in communication with the inter-skin space, the thermal store comprising a rock pile and the rock pile being arranged to anchor the perimeter of the wall construction to the ground.

17. The air-supported structure of claim 16, wherein the venting means comprises flap valves at the perimeter of the wall construction for controlling ingress and egress of air to the inter-skin space.

* * * * *